(12) United States Patent
Fortier

(10) Patent No.: US 8,645,063 B2
Fortier
(45) Date of Patent: Feb. 4, 2014

(54) METHOD AND SYSTEM FOR INITIAL QUATERNION AND ATTITUDE ESTIMATION

(75) Inventor: Matthew D. Fortier, Walnut Creek, CA (US)

(73) Assignee: Custom Sensors & Technologies, Inc., Moorpark, CA (US)

( * ) Notice: Subject to any disclaimer, the term of this patent is extended or adjusted under 35 U.S.C. 154(b) by 455 days.

(21) Appl. No.: 12/976,603

(22) Filed: Dec. 22, 2010

(65) Prior Publication Data
US 2012/0166082 A1   Jun. 28, 2012

(51) Int. Cl.
*G01C 21/10* (2006.01)

(52) U.S. Cl.
USPC .......................................... 701/500; 701/400

(58) Field of Classification Search
USPC ......... 701/400, 466, 473, 495, 500, 502, 505, 701/506, 518, 534
See application file for complete search history.

*Primary Examiner* — Thomas Tarcza
*Assistant Examiner* — Adam Tissot
(74) *Attorney, Agent, or Firm* — Hunter Clark PLLC

(57) ABSTRACT

Techniques are provided to determine an initial quaternion transform that is used to transform measurements received from accelerometer, rate sensor and inertial reference subsystems from a vehicle coordinate frame to an inertial navigation frame. Methods disclosed determine corrective angular rates to use as a feedback signal to rotate the quaternion transform to counter errors that result when transforming a gravity vector and an inertial reference vector (e.g., a magnetic North reference vector) that are being measured by the accelerometer and an inertial reference subsystems, respectively. The initial quaternion determination is performed during a time period when the only substantial acceleration on the vehicle is due to gravity. The initial quaternion can be used for processing various guidance, navigation and control functions.

19 Claims, 5 Drawing Sheets

METHOD AND SYSTEM FOR INITIAL QUATERNION AND ATTITUDE ESTIMATION

BACKGROUND

Techniques are provided for determining an initial attitude quaternion transform, for example based on measurements from a combination of rate sensors, accelerometers, and an inertial reference sensor.

An inertial navigation system (INS) is used to direct a vehicle from one point to another. An INS measures changes in velocity through the use of accelerometers and rate sensors (e.g., gyroscopes). An INS extrapolates a vehicle's position, velocity and attitude by processing changes in the vehicle's motion sensed by inertial instruments. In order to extrapolate position, velocity and attitude correctly, an initial heading of the vehicle relative to an inertial reference frame is needed. If the initial attitude of the vehicle is known precisely, then this can be input to the INS and the extrapolation can proceed. However, if the initial attitude is not known, then an initial inertial reference indication is needed.

Typically, accelerometer readings of the gravity vector and magnetometer readings of magnetic North are used in an Euler angle solution algorithm to provide an initial quaternion for extrapolating position, velocity and attitude. However, the Euler angle solution is complicated and suffers from a singularity when one of the accelerometer axes is aligned with the gravity vector, which is the case for vehicles including, for example, vertical launch vehicles. This singularity prohibits the use of the Euler angle solution.

SUMMARY

An example of a method of determining a quaternion for relating a vehicle coordinate frame to an inertial coordinate frame according to the disclosure includes receiving periodic indications of angular rates of the vehicle from a plurality of angular rate sensors associated with the vehicle during a first time period, receiving periodic indications of acceleration that the vehicle is experiencing during the first time period when acceleration that the vehicle is subject to is due to gravity and receiving periodic indications of an inertial reference vector during the first time period, the inertial reference vector indications being in a vehicle coordinate frame. The method further includes transforming the received acceleration and inertial reference vector indications from the vehicle coordinate frame to an inertial navigation coordinate frame based on a current quaternion to provide transformed acceleration indications and transformed reference vector indications, determining an angular error vector in the inertial navigation coordinate frame by comparing the transformed acceleration indications to a predefined gravity vector in the inertial navigation coordinate frame and by comparing the transformed inertial reference vector indications to a predefined reference vector in the inertial navigation coordinate frame, and determining an angular rate correction vector, to counter the determined angular error vector in the inertial navigation coordinate frame, based on the determined angular error vector and a first gain factor. The method further includes transforming the angular rate correction vector from the inertial navigation coordinate frame to the vehicle coordinate frame, to produce vehicle angular rate corrections, based on the current quaternion, determining corrective vehicle rates based on the received angular rate indications and the vehicle angular rate corrections, and determining an updated quaternion by integrating a rotation of the current quaternion over a second time period based on the determined corrective vehicle rates, the second time period being a portion of the first time period.

Implementations of such a method may include one or more of the following features. Determining the angular rate correction vector includes determining that at least one component of the angular error vector has converged below a threshold, and in response to determining that the at least one component of the angular error vector has converged below the threshold, determining at least one component of the angular rate correction vector based on a second gain factor that is lower than the first gain factor. Determining that at least one component of the angular error vector has converged below the threshold includes determining that a magnitude of the angular error vector has converged below the threshold. Determining the angular error vector includes comparing the transformed inertial reference vector indications to a local tangent reference vector that is perpendicular to the gravity vector. Determining the angular rate corrections includes limiting at least one component of the determined angular rate correction vector to a maximum value to produce a limited angular rate correction vector, and determining the corrective vehicle rates based on the limited angular rate correction vector. The method further includes low-pass filtering the angular rate correction vector, and determining the corrective vehicle rates based on the filtered angular correction vector. The low-pass filtering includes using a low-pass filter with a cut-off frequency of about 10 Hz. The method further includes determining if a magnitude of the acceleration indications is below a threshold value, and in response to determining that the magnitude of the acceleration indications is below the threshold, setting the angular rate correction vector to zero. The method further includes determining if a magnitude of the acceleration indications is above a threshold value, and in response to determining that the magnitude of the acceleration indications is above the threshold value, setting the angular rate correction vector to zero.

An example of an attitude estimation system according to the disclosure includes an input interface that includes a first input configured to couple to angular rate sensors associated with a vehicle and receive periodic indications of angular rates of the vehicle during a first time period, a second input configured to couple to an accelerometer subsystem and receive periodic indications of acceleration that the vehicle is experiencing during the first time period when acceleration that the vehicle is subject to is due to gravity, and a third input configured to couple to an inertial reference subsystem and receive periodic indications of an inertial reference vector during the first time period, the inertial reference vector indications being in a vehicle coordinate frame. The system further includes a first quaternion transform subsystem coupled to the input interface and configured to transform the acceleration and inertial reference vector indications received during the first time period from the vehicle coordinate frame to an inertial navigation coordinate frame based on a current quaternion to provide transformed acceleration indications and transformed reference vector indications. The system further includes an attitude correction control subsystem coupled to the first quaternion transform subsystem and configured to: determine an angular error vector in the inertial navigation coordinate frame by comparing the transformed acceleration indications to a predefined gravity vector in the inertial navigation coordinate frame and by comparing the transformed inertial reference vector indications to a predefined reference vector in the inertial navigation coordinate frame, and determine an angular rate correction vector, to counter the determined angular error vector in the inertial navigation coordinate frame, based on the determined angular error vector and a first gain factor. The system further includes a second quaternion transform subsystem coupled to the attitude correction control subsystem and configured to transform the angular rate correction vector from the inertial navigation coordinate frame to the vehicle coordinate frame, to produce vehicle angular rate corrections, based on the current quaternion. The system further includes a quaternion update subsystem coupled to the input interface, the attitude correction control subsystem and the first and second quaternion transform subsystems and configured to: determine corrective vehicle rates based on the received angular rate indications and the vehicle angular rate corrections, and determine an updated quaternion by integrating a rotation of the current quaternion over a second time period based on the determined corrective vehicle rates, the second time period being less than the first time period.

Implementations of such an attitude estimation system may include one or more of the following features. The attitude correction subsystem is configured to determine that at least one component of the angular error vector has converged below a threshold, and in response to determining that the at least one component of the angular error vector has converged below the threshold, determine at least one component of the angular rate correction vector based on a second gain factor that is lower than the first gain factor. The attitude correction control subsystem determines that at least one component of the angular error vector has converged by determining that a magnitude of the angular error vector has converged below the threshold. The attitude correction control subsystem is configured to determine the angular error vector by comparing the transformed inertial reference vector indications to a local tangent reference vector that is perpendicular to the gravity vector. The attitude correction control subsystem is configured to limit at least one component of the determined angular rate correction vector to a maximum value to produce a limited angular rate correction vector, and the quaternion update subsystem is configured to determine the corrective vehicle rates based on the limited angular rate correction vector. The attitude estimation system further includes a filter configured to low-pass filter the angular rate correction vector, and the quaternion update subsystem determines the corrective vehicle rates based on the filtered angular rate correction vector. The filter is a low-pass filter with a cut-off frequency of about 10 Hz. The attitude correction subsystem is further configured to determine if a magnitude of the acceleration indications is below a threshold value, and in response to determining that the magnitude of the acceleration indications is below the threshold, set the angular rate correction vector to zero. The attitude correction subsystem is further configured to determine if a magnitude of the acceleration indications is above a threshold value, and in response to determining that the magnitude of the acceleration indications is above the threshold, set the angular rate correction vector to zero.

Another example of an attitude estimation system in accordance with the disclosure includes an input interface that includes a first input configured to couple to angular rate sensors associated with a vehicle and receive periodic indications of angular rates of the vehicle during a first time period, a second input configured to couple to an accelerometer subsystem and receive periodic indications of acceleration that the vehicle is experiencing during the first time period when acceleration that the vehicle is subject to is due to gravity, and a third input configured to couple to an inertial reference subsystem and receive periodic indications of an inertial reference vector during the first time period, the inertial reference vector indications being in a vehicle coordinate frame. The attitude estimation system further includes a first quaternion transform subsystem coupled to the input interface and configured to transform the acceleration and inertial reference vector indications received during the first time period from the vehicle coordinate frame to an inertial navigation coordinate frame based on a current quaternion to provide transformed acceleration indications and transformed reference vector indications. The attitude estimation system further includes an attitude correction control subsystem coupled to the first quaternion transform subsystem, the attitude correction control subsystem including: means for determining an angular error vector based on the transformed acceleration indications and a predefined gravity vector in the inertial navigation coordinate frame and further based on the transformed inertial reference vector indications and a predefined reference vector in the inertial navigation coordinate frame, and means for determining an angular rate correction vector, to counter the determined angular error vector based on the determined angular error vector and a first gain factor. The attitude estimation system further includes a second quaternion transform subsystem coupled to the attitude correction control subsystem and configured to transform the angular rate correction vector from the inertial navigation coordinate frame to the vehicle coordinate frame, to produce vehicle angular rate corrections, based on the current quaternion. The attitude estimation system further includes a quaternion update subsystem coupled to the input interface, the attitude correction control subsystem and the first and second quaternion transform subsystems, where the quaternion updated subsystem includes means for determining corrective vehicle rates based on the received angular rate indications and the vehicle angular rate correction vector, and for determining an updated quaternion by integrating a rotation of the current quaternion over a second time period based on the determined corrective vehicle rates, the second time period being less than the first time period.

DETAILED DESCRIPTION

Systems and methods in accordance with the disclosure are used to determine an initial quaternion transform that is used to transform measurements received from accelerometer, rate sensor and inertial reference subsystems from a vehicle coordinate frame to an inertial navigation frame. The methods used provide stability and reduce, or eliminate, singularities that can occur in other methods, such as in solving for Euler angles using traditional methods. Such singularities occur when one of the vehicle coordinate frame axes is aligned with one of the inertial navigation frame axes. The methods disclosed herein determine corrective angular rates to use as a feedback signal to rotate the quaternion transform to counter errors that result when transforming a gravity vector and an inertial reference vector (e.g., a magnetic North reference vector) that are being measured by the accelerometer and an inertial reference subsystems, respectively. The initial quaternion determination is performed during a time period when the only substantial acceleration on the vehicle is due to gravity. Example methods assume no initial vehicle orientation and do not suffer from singularities as in calculating Euler angle solutions. The initial quaternion can be used by navigation system for processing various guidance, navigation and control functions.

Figure 1:
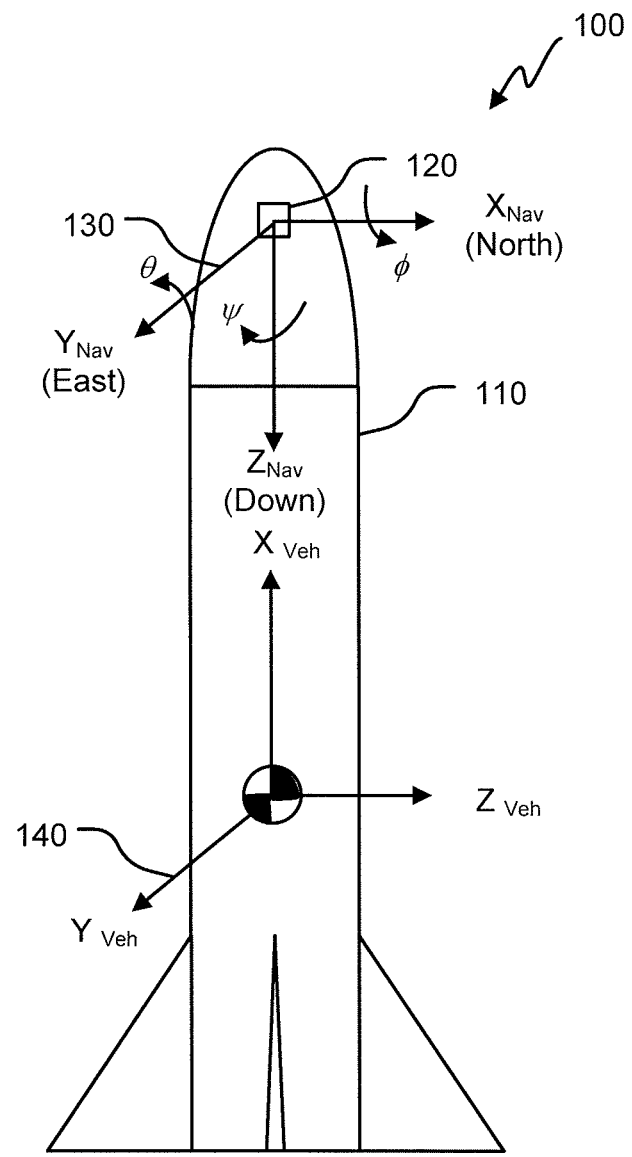
FIG. 1 is a schematic illustration of a vehicle that includes an inertial navigation system.
Figure 2:
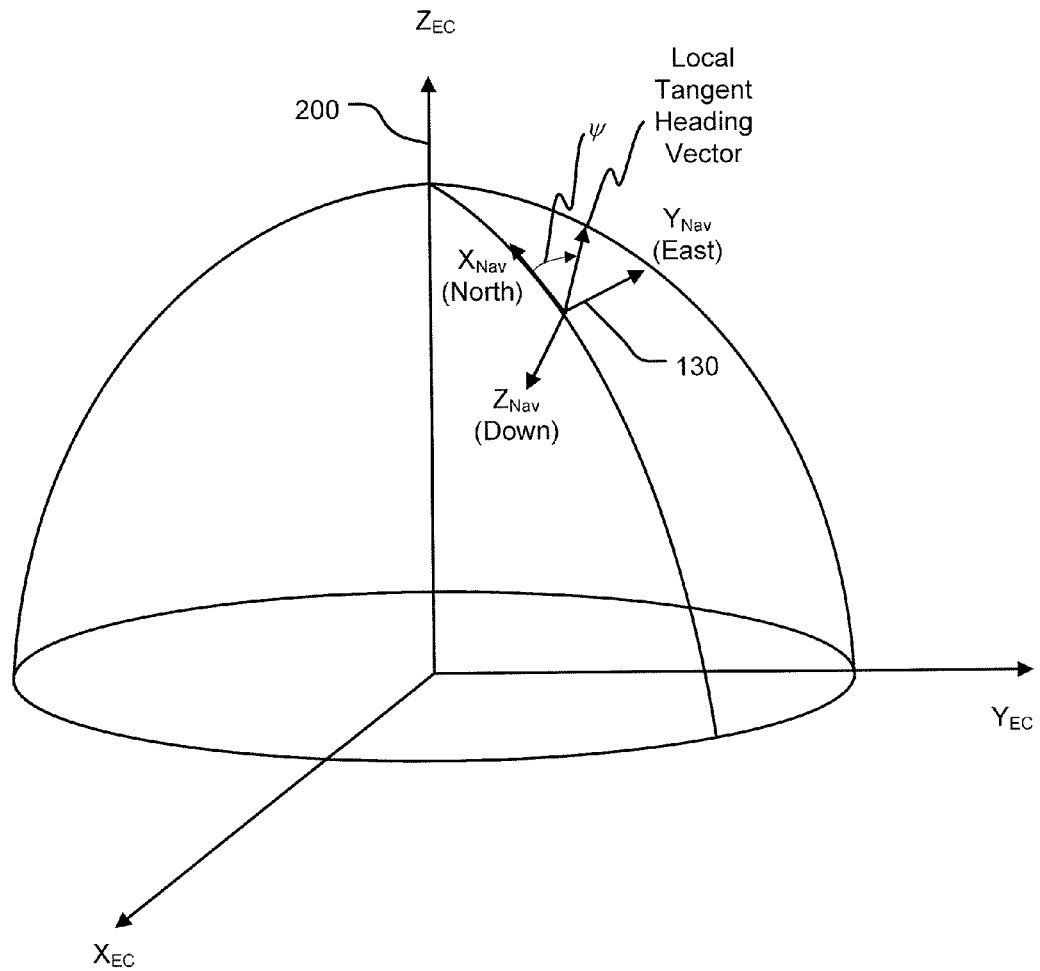
FIG. 2 is a three-dimensional diagram of a local tangent inertial coordinate frame relative to an earth centered coordinate frame.

Referring to FIGS. 1-2, a vehicle 100 includes a body 110, and an inertial navigation system (INS) 120. In this example, the vehicle 100 is a vertical launch vehicle, but other vehicles can utilize the systems and methods described herein. The INS 120 has a corresponding inertial navigation coordinate frame 130. In this example, the navigation coordinate frame 130 is a local tangent coordinate frame and the INS 120 is disposed such that the coordinate frame 130 has a z-axis aligned with a length of the body 110. In this configuration, when the body 110 is in its normal resting position, extending vertically as shown, the coordinate frame 130 is aligned relative to the earth such that a $Z_{Nav}$ axis points down (aligned with the local gravity vector), an $X_{Nav}$ axis points North and a $Y_{Nav}$ axis points East. FIG. 2 shows the navigation coordinate frame 130 relative to an earth centered coordinate frame 200.

The INS 120 includes two main systems, a vertical gyro (VG) system and an attitude heading reference system (AHRS). The VG system uses acceleration and rate indications from accelerometers and rate sensors, respectively, to determine a roll angle (a rotation about the $X_{Nav}$ axis) and a pitch angle (a rotation about the $Y_{Nav}$ axis). The AHRS system uses an inertial reference indication (magnetic North) received from magnetometers to determine a heading angle (a rotation about the $X_{Nav}$ axis).

The roll, pitch and yaw outputs correspond to Euler angles that transform the navigation frame 130 to a vehicle frame 140. The Euler angles include a first rotation angle $\phi$ (roll) about the $X_{Nav}$ axis, which results in the $Y_{Nav}$ and $Z_{Nav}$ axes being rotated to $Y'_{Nav}$ and $Z'_{Nav}$ axes, respectively. The Euler angles also include a second rotation angle $\theta$ (pitch) about the $Y'_{Nav}$ axis, which results in the $X_{Nav}$ axis and the $Z'_{Nav}$ axis being rotated to $X''_{Nav}$ and $Z''_{Nav}$, respectively. A third Euler rotation angle $\psi$ (yaw) about the $Z''_{Nav}$ axis results in the desired vehicle coordinate frame 140 axes $X_{Veh}$, $Y_{Veh}$ and $Z_{Veh}$. In the example of FIG. 1, the Euler angles used to transform the navigation coordinate frame 130 to the vehicle coordinate frame 140 are $(\phi, \theta, \psi)=(0°, 90°, 0°)$.

The rate sensors, accelerometers and magnetometers are fixed to the body 110 and output their respective data in the vehicle coordinate frame 140. When the INS is first activated, the Euler angles transforming the navigation frame to the vehicle frame are calculated by the INS 120. In the example shown in FIG. 1, the calculation of the Euler angles cannot be done using the traditional Euler angle calculation approaches because the $X_{Veh}$ axis and the $Z_{Nav}$ axis are perfectly aligned and a singularity occurs due to the 90° pitch angle. This singularity also prohibits the use of the accelerometer measurements to estimate the initial roll, pitch and yaw Euler angles. The following traditional equations represent one way of calculating roll, pitch and yaw Euler angles using accelerometer measurements (Ax, Ay and Az in the vehicle coordinate frame 140) and are used to demonstrate the singularity problem:

$$\text{Roll: } \phi = -\arctan\left(\frac{\eta}{\eta}\right) = ? \tag{1}$$

$$\text{Pitch: } \theta = -\arcsin\left(\frac{A_x + \eta}{9.8}\right) \tag{2}$$

$$\text{Yaw: } \psi = -\arctan\left(\frac{A_y + \eta}{A_z + \eta}\right) \tag{3}$$

For the vehicle 100, the accelerometer measurements will indicate only gravity in the $-X_{Veh}$ direction or [Ax, Ay, Az]= $[\eta, -9.8, \eta]$ m/sec², where $\eta$ represents a noise level of the accelerometers and corresponds to a very small value or zero. As a result, the roll angle $\phi$ is a non-deterministic result.

The algorithm described herein determines an initial quaternion transform that transforms measurements from the navigation coordinate frame 130 to the vehicle coordinate frame 140 for any roll, pitch and yaw angles, including the example shown in FIG. 1, without experiencing singularity issues as with the Euler angle approach. For example, a transform algorithm is provided that assumes no prior knowledge of a local magnetic field or an orientation of the host vehicle 100.

Figure 3:
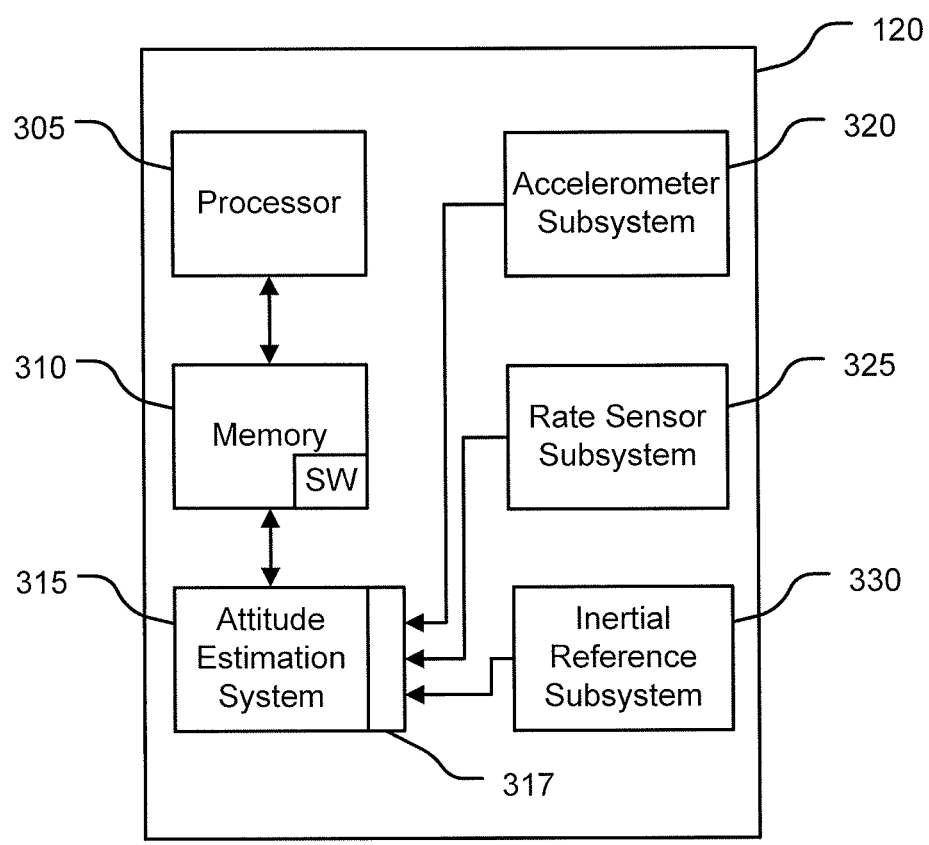
FIG. 3 is a block diagram of the inertial navigation system of FIG. 1 that includes an attitude initialization/estimation system.

Referring to FIG. 3, the INS 120 includes a processor 305, memory 310, an attitude initialization/estimation system 315 (herein referred to as the attitude estimation system 315), an accelerometer subsystem 320, a rate sensor subsystem 325 and an inertial reference system 330. The processor 305 is a programmable device, e.g., a central processing unit (CPU), such as those made by Intel® Corporation or AMD®, a microcontroller, an application specific integrated circuit (ASIC), a field-programmable gate array (FPGA), etc. The processor 305 processes information received from the attitude estimation system 315 and performs functions associated with the INS 120 such as, for example, guidance, navigation and control functions. The memory 310 includes random access memory (RAM) and/or read-only memory (ROM). The memory 310 stores a non-transitory computer program product comprising processor-readable, processor-executable software code containing instructions that are configured to, when executed, cause the processor 305 to perform various functions described herein. Alternatively, the software may not be directly executable by the processor 305 but configured to cause the processor 305, e.g., when the instructions are compiled and executed, to perform the functions described.

The accelerometer subsystem 320 provides acceleration information for each of the three axes of the vehicle coordinate frame 140. Alternatively, subsystem 320 could include a single multi-axis accelerometer, or any combination of single and multi-axis accelerometers that accelerometer information for each of the three vehicle coordinate frame axes. The type of accelerometers employed can include piezoelectric, shear mode, micro electro-mechanical system (MEMS), surface micromachined capacitive (a MEMS device), capacitive spring mass base, electromechanical servo (servo force balance), optical, surface acoustic wave (SAW), laser, etc.

The rate sensor subsystem 325 includes at least three rate sensors with a rate sensor aligned with each of the axes of the vehicle coordinate frame 140. The rate sensors can include mechanical gyroscopes, MEMS gyroscopes, ring laser gyroscopes, fiber optic gyroscopes, vibrating structure gyroscope (also known as a coriolis vibratory gyroscope), etc. The inertial reference subsystem 330 can include magnetometers and/or an optical sky sensor.

The attitude estimation system 315 can be implemented in software executable by the processor 305 or can be a stand-alone microcontroller, application specific integrated circuit (ASIC), field-programmable gate array (FPGA), a combination of two or more of these, etc. The attitude estimation system 315 includes an input interface 317 that is coupled to the accelerometer, rate sensor and inertial reference subsystems 320, 325 and 330. The subsystems 320, 325 and 330 provide their respective measurements in the vehicle coordinate frame 140. Upon initial activation (e.g., prior to launching the vehicle 100), the attitude estimation system 315 calculates an initial quaternion transform between the navigation coordinate frame 130 and the vehicle coordinate frame 140. Upon initial activation, it is assumed that the vehicle 100 is experiencing acceleration only due to gravity (i.e., a 1G gravitational field) at an arbitrary orientation. Further to providing an initial quaternion estimate, the attitude estimation system 315 can estimate updated quaternion transforms during any period when the vehicle is experiencing a 1G acceleration due only to gravity. For example, if the vehicle 100 were a winged aircraft, the quaternion could be updated while the aircraft is traveling at a constant speed and direction.

The attitude estimation subsystem 315 uses indications of acceleration from the accelerometer subsystem 320 to align the measured gravity vector in the vehicle coordinate frame 140 with a predefined gravity vector in the navigation coordinate frame 130 (e.g., the gravity vector is in a downward direction along the $Z_{Nav}$ axis [0, 0, 1] in the navigation coordinate frame 130). The attitude estimation subsystem 315 uses indications of an inertial reference vector (e.g., magnetic North) received from the inertial reference subsystem 330 to align the measured reference vector in the vehicle coordinate frame 140 with a predefined reference vector in the navigation coordinate frame 130 (e.g., North being in a direction along the $X_{Nav}$ axis [1, 0, 0]).

Figure 4:
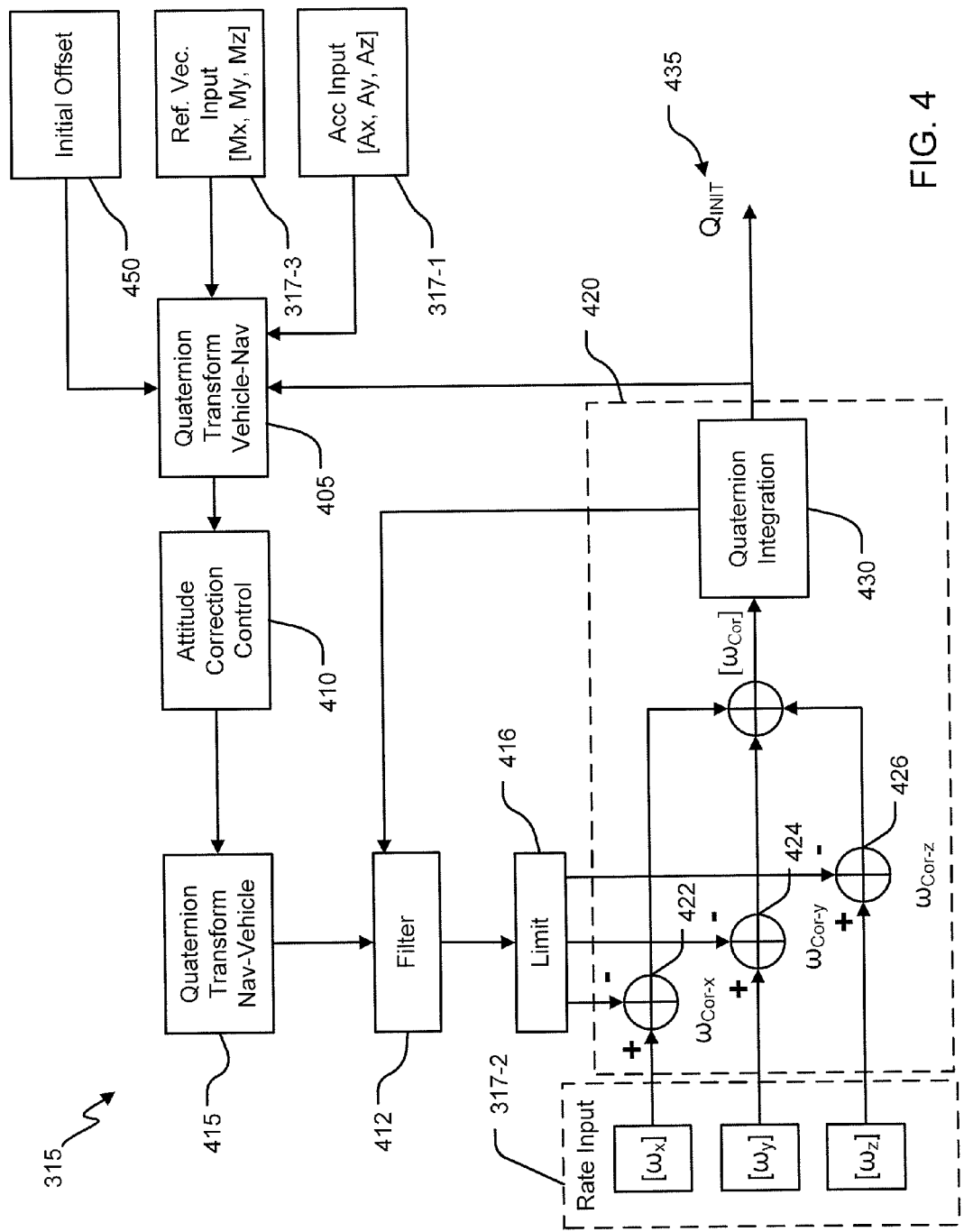
FIG. 4 is a functional block diagram of the attitude initialization/estimation system shown in FIG. 3.

Referring to FIG. 4 with further reference to FIG. 1, an example of the attitude estimation system 315 includes the components shown. The input interface 317 in this example is made up of three individual input interfaces, an acceleration input interface 317-1 coupled to the accelerometer subsystem 320, a rate input interface 317-2 coupled to the rate sensor subsystem 325, and a reference vector input interface 317-3 coupled to the inertial reference subsystem 330. The acceleration indications [Ax, Ay, Az] and the inertial reference indications [Mx, My, Mz] are in the vehicle coordinate frame 140. These acceleration and inertial reference indications are transformed to the navigation coordinate frame 130 by a vehicle-to-navigation quaternion transform (V-N transform) module 405 using a quaternion Q=[q1, q2, q3, q4]. Upon activation of the INS 120, the quaternion Q is not known. Therefore, the first indications received from the input interfaces 317-1 and 317-3 will be transformed using a best-guess or default quaternion provided by an initial offset module 450. The attitude estimation system 315 will update the quaternion, using a quaternion update subsystem 420, until the measured acceleration and inertial reference indications, upon being transformed to the navigation frame, are aligned with the predefined gravity vector [0, 0, 1] and the predefined magnetic North reference vector [1, 0, 0]. The V-N transform module 405 receives the updated quaternion from the quaternion update subsystem 420. A vector $\overline{R}_{Veh}$ in the vehicle coordinate frame 140 is transformed to the navigation coordinate frame 130 by the module 405 for a given quaternion Q using the following matrix expression:

$$\overline{R}_{Nav}=[Q]\overline{R}_{Bdy}[Q]^* \quad (4)$$

where the quaternion $[Q]=[q_0, q_1, q_2, q_3,]^T$ and the conjugate quaternion $[Q]^*=[q_0, -q_1, -q_2, -q_3]^T$. The explicit solution of Expression (4) is shown below:

$$R_{Nav}(1)=2*((-q2*q2-*q3)*Rx+(q1*q2-q0*q3)*Ry+ (q0*q2+q1*q3)*Rz)+Rx; \quad (5)$$

$$R_{Nav}(2)=2*((q0*q3+q1*q2)*Rx+(-q1*q1-q3* q3)*Ry+(q2*q3-q0*q1)*Rz)+Ry; \quad (6)$$

$$R_{Nav}(3)2*((q1*q3-q0*q2)*Rx+(q0*q1+q2*q3)*Ry+ (-q1*q1-q2*q2)*Rz)+Rz; \quad (7)$$

The initial offset module 450 provides the initial quaternion that corresponds to an initial angular offset vector, designated $[\phi_{OFF}, \theta_{OFF}, \psi_{OFF}]$ The initial angular offset vector can be determined when one or more of the initial roll, pitch and yaw angles of the vehicle 100 is known or is likely to be at or near a known value. For example, with a vertical launch the initial value of pitch, $\theta_{OFF}$, can be set to 90°.

An attitude correction control (ACC) subsystem 410 receives the transformed acceleration and inertial reference vector indications from the V-N transform module 405. The ACC subsystem 410 uses the knowledge that the measured acceleration indications [Ax, Ay, Az] should align with the known gravity vector, [0, 0, 1] in this example, and that the measured magnetic north inertial reference vector indications [Mx, My, Mz] should align with the XNav axis, [1, 0, 0] in this example, to calculate angular errors (e.g., roll, pitch and yaw) that result from using the current quaternion Q. The ACC subsystem 410 calculates angular rates, referred to collectively as an angular rate correction vector or ARCV, that will counteract the angular errors. The ARCV rates will be used, along with the measured vehicle rates, to rotate the current quaternion Q(n) to arrive at an updated quaternion Q(n+1).

The ARCV rates are transformed from the navigation coordinate frame 130 back to the vehicle coordinate frame 140 with a navigation-to-vehicle quaternion transform module 415 (herein referred to as N-V transform module 415). The N-V transform module 415 uses the current quaternion Q and the following matrix expression to transform a vector $\overline{R}_{Nav}$ from the navigation coordinate frame 130 to the vehicle coordinate frame 140:

$$\overline{R}_{Veh}=[\omega]*\overline{R}_{Nav}[Q] \quad (8)$$

The transformed ARCV rates are filtered with a low-pass filter 412. The low-pass filter 412 has a cutoff frequency of about 10 Hz in this example. The low-pass filter 412 can be omitted. The cutoff frequency of the low-pass filter 412 can be in a range from about 2 Hz to about 100 Hz, depending on factors such as, for example, a desired rate of convergence (response time), convergence stability, and/or the noisiness of the accelerometers and/or the inertial reference sensors.

A rate limit function module 416 limits the transformed ARCV rates to be less than a threshold value. The individual rates of the ARCV can be limited, and/or the combined magnitude of the rates of the ARCV can be limited. The rate limit thresholds help prevent spurious measurements from adversely affecting the convergence of the quaternion Q. The limit function module 416 is an optional component of the attitude estimation system 315.

The limited ARCV rates are provided to the quaternion update subsystem 420, and are subtracted from the vehicle rates provided via the rate input interface module 317-2, using adders 422, 424, 426 to arrive at a corrective vehicle rate vector: $[\omega_{Cor}]=[\omega_{X-Cor}, \omega_{Y-Cor}, \omega_{Z-Cor}]$. The corrective vehicle rate vector $[\omega_{Cor}]$ is provided to a quaternion integration subsystem 430 which calculates the updated quaternion Q(n+1) based on the current quaternion Q(n) and the corrective vehicle rate vector [$\omega_{Cor}$]. The updated quaternion Q(n+1) is provided to the V-N transform module 405 and the N-V transform module 415 to transform the next received acceleration and inertial reference indications to the navigation coordinate frame 130 and to transform the next ARCV rates computed by the ACC subsystem 410 to the vehicle coordinate frame 140. Thus, the corrective vehicle rate vector [$\omega_{Cor}$] serves as feedback in determining the initial quaternion. When the initial quaternion has converged to within a threshold value, e.g., when a magnitude of an angle of rotation of the quaternion changes less than about 0.1 degrees, depending on the quality of the sensors, from one iteration to the next, or when a time period expires, the attitude estimation system 315 terminates the quaternion integration and outputs the finalized estimate of the initial quaternion $Q_{INIT}$ 435. Details performed by the various components of the attitude estimation system 315 will now be described in reference to an exemplary process.

Figure 5:
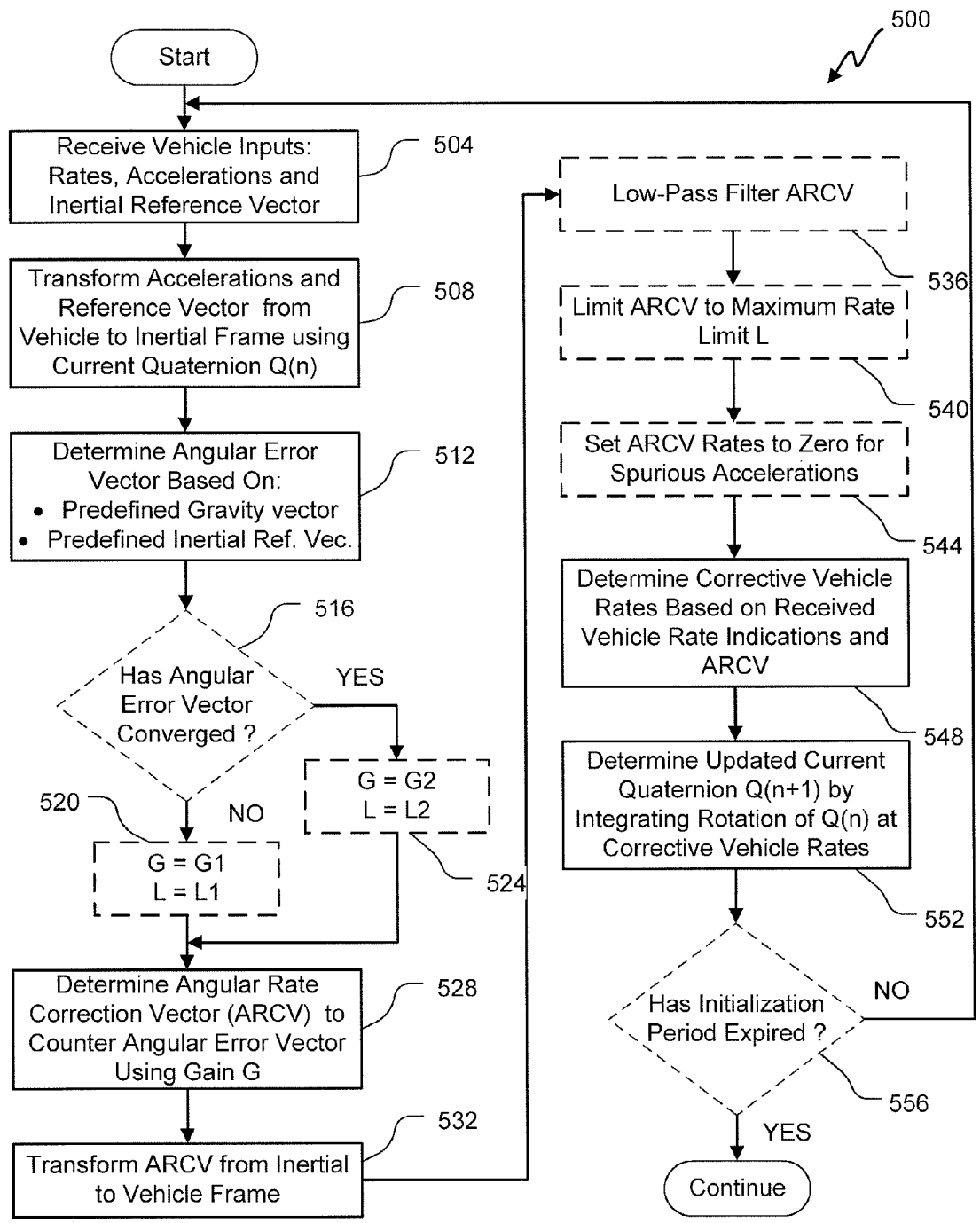
FIG. 5 is a flowchart of a process of determining an initial quaternion relating a vehicle coordinate frame to an inertial coordinate frame using the attitude initialization/estimation system of FIG. 3.

Referring to FIG. 5, with further references to FIGS. 1, 3 and 4, a process 500 of determining a quaternion for relating the vehicle coordinate frame 140 to the inertial navigation coordinate frame 140 using the attitude estimation system 315 of FIGS. 3 and 4 includes the stages shown. The process 500 is, however, an example only and not limiting. The process 500 can be altered, e.g., by having stages added, removed, or rearranged.

Process 500 starts at stage 504 where the attitude estimation system 315 receives periodic indications of vehicle rates, vehicle accelerations and an inertial reference vector from the rate sensor subsystem 325 (via the rate input interface 317-2), from the accelerometer subsystem 320 (via the accelerometer input interface 317-1) and from the inertial reference subsystem 330 (via the reference vector input interface 317-3), respectively. The indications of vehicle rates, vehicle accelerations and inertial reference vectors are all received in the vehicle coordinate frame 140, in this example.

Upon receiving the acceleration indications and the inertial reference vector indications at stage 504, the V-N transform module 405 transforms the acceleration indications, [$\hat{A}_{Veh}$(n)][$Ax_{Veh}$, $Ay_{Veh}$, $Az_{Veh}$] and the inertial reference vector indications [$M_{Veh}$(n)]=[$Mx_{Veh}$, $My_{Veh}$ and $Mz_{Veh}$] from the vehicle coordinate frame 140 to the inertial navigation coordinate frame 130 using the current quaternion Q(n). Upon initial activation of the attitude estimation system 315, the current quaternion Q(0) is the quaternion provided by the initial offset module 450. In subsequent update periods, the current quaternion (i.e., Q(n)) is replaced by an updated quaternion (Q(n+1)) that is determined by the quaternion update subsystem 420.

At step 508, the V-N transform module 405 normalizes the $\hat{A}_{Veh}$(n) and $\hat{M}_{Veh}$(n) vectors using the following equations:

$$\overrightarrow{A_{Veh}}(n) = \frac{\hat{A}_{Veh}(n)}{\sqrt{Ax_{Veh}(n)^2 + Ay_{Veh}(n)^2 + Az_{Veh}(n)^2}} \quad (9)$$

$$\overrightarrow{M_{Veh}}(n) = \frac{\hat{M}_{Veh}(n)}{\sqrt{Mx_{Veh}(n)^2 + My_{Veh}(n)^2 + Mz_{Veh}(n)^2}} \quad (10)$$

The V-N transform module 405 transforms the normalized acceleration and inertial reference vector indications using the current quaternion estimate Q(n) as follows:

$$\overrightarrow{A_{Nav}} = [Q(n)]\overrightarrow{A_{Veh}}(n)[Q(n)]^* \quad (11)$$

$$\overrightarrow{M_{Nav}} = [Q(n)]\overrightarrow{M_{Veh}}(n)[Q(n)]^* \quad (12)$$

The ACC subsystem 410 receives the transformed acceleration indications [$\overrightarrow{A_{Nav}}$(n)]=[$Ax_{Nav}$, $Ay_{Nav}$, $Az_{Nav}$] and the transformed inertial reference vector [$\overrightarrow{M_{Nav}}$(n)]=[$Mx_{Nav}$, $My_{Nav}$ and $Mz_{Nav}$] from the V-N transform module 405. At stage 512, the ACC subsystem 410 determines an angular error vector in the navigation coordinate frame 130 by comparing the transformed acceleration indications $\overrightarrow{A_{Nav}}$(n) to a pre-defined gravity vector (e.g., [0, 0, 1]) in the navigation coordinate frame 130 and by comparing the transformed inertial reference vector $\overrightarrow{M_{Nav}}$(n) indications to a predefined reference vector (e.g., magnetic North at [1, 0, 0]) in the inertial coordinate frame 130. The concept behind the methodology used by the ACC subsystem 410 uses the knowledge that the sensor measurements transformed to the navigation frame should appear to match the expected predefined vectors. Using this concept, the angular errors for roll, pitch and yaw, in the navigation coordinate frame 130, can be computed with the following trigonometric expressions:

$$\text{Roll Error: } \phi_{error}(n) = \arctan\left(\frac{Ay_{Nav}(n)}{Az_{Nav}(n)}\right) \quad (13)$$

$$\text{Pitch Error: } \theta_{error}(n) = \arcsin(Ax_{Nav}(n)) \quad (14)$$

$$\text{Yaw Error: } \psi_{error}(n) = -\arctan_2\left(\frac{My_{Nav}(n)}{Mx_{Nav}(n)}\right) \quad (15)$$

The arctan(−) function is a two-quadrant arc-tangent function that returns an angle in a range from −90° to +90° The arctan$_2$ (−) function is a four-quadrant arc-tangent function that returns an angle in a range from −180° to +180°. The roll, pitch and yaw errors determined with Eqs. (13), (14), and (15), respectively, are referred to collectively as the angular error vector or AEV(n), and is represented as follows:

$$AEV(n) = \begin{bmatrix} \phi_{error}(n) \\ \theta_{error}(n) \\ \psi_{error}(n) \end{bmatrix} \quad (16)$$

Each of the components of the attitude error vector AEV(n) is a feedback control term that is directly proportional to the amount of correction that is applied by the quaternion integration subsystem 430 to calculate the updated quaternion Q(n+1). At step 528, the ACC subsystem 410 determines an angular rate correction vector or ARCV(n) to counter the angular error vector AEV(n). However, in the example process 500, optional processing is performed prior to stage 528, at stages 516, 520 and 524, to set gain factors and angular rate limits based on a state of convergence of the angular error vector AEV(n).

At optional stage 516, the ACC subsystem 410 determines if the attitude error vector has converged. During the early stages of initialization, a high gain factor and high angular rate limit are utilized to speed up the initialization process. After the angular error vector has converged below a threshold, a lower gain factor and lower angular rate limit are used to fine tune the quaternion. The ACC subsystem 410 determines convergence based on a magnitude of the attitude error vector AEV(n), that is determined using the following formula:

$$\text{Mag\_AEV}(n) = \sqrt{\phi_{error}(n)^2 + \theta_{error}(n)^2 + \psi_{error}(n)^2} \quad (17)$$

If it is determined that the Mag_AEV(n) value has not converged below a threshold value, the process 500 proceeds to stage 520, where the gain factor G is set equal to a high gain G1 and the angular rate limit vector L=[Lx, Ly, Lz] is set equal to a high rate limit vector L1=[Lx$_1$, Ly$_1$, Lz$_1$]. In this example, the threshold value is about 1° (i.e., the change between successive AEV calculations is less tan about 1° to be considered converged), the high gain G1=100 and the high rate limit vector L1=[20, 20, 20] rad/sec. The threshold value can be in a range from about 0.1° to about 5°. The high gain G1 and the high rate limit L1, in this example, are considered very high values, but they result in faster initial quaternion convergence. Other values of G1 and L1 can be used. The values of G1 and L1 can be determined using stability and performance analyses to provide a desired initial transition rate of convergence.

As an alternative to using a single threshold value at the decision stage 516, different threshold values can be used for the individual angular error vector components. This helps the different components of angular error to be treated differently. For example, it may be more important to converge more finely in pitch and yaw than in roll, or vice-versa. In this alternative example, the gain factor G can be a vector with different values of gain for the different components of roll, pitch and yaw.

If, at stage 516, it is determined that the Mag_AEV(n) value has converged below the threshold, the process 500 proceeds to stage 524, where the gain G is set equal to a low gain value G2 and the angular rate limit vector L is set equal to L2. In this example, G2=25 and L2=[0.9, 0.9, 0.9] rad/sec. The gain factor G2 is lower than the gain factor G1 and the angular rate limits of L2 are lower than the angular rate limits of L1. Thus, after the angular error vector has converged, the control authority of the quaternion update subsystem 420 is reduced. This reduction inhibits over correction that may result from erroneous sensor measurements. The values of G2 and L2 can be determined to provide a desired level of immunity to noise and desired stability.

Upon determining whether to use the high gain factor G1 and the high angular rate limits L1, or the low gain factor G2 and the low angular rate limits L2, the process proceeds to stage 528 where the ACC subsystem 410 determines the angular rate correction vector ARCV(n) to counter the determined angular error vector AEV(n). The ACC subsystem 410 uses the gain factor G, set at either stage 520 or stage 524, to determine the ARCV(n), in the navigation coordinate frame 130, using the following formula:

$$ARCV_{Nav}(n) = G \begin{bmatrix} \phi_{error}(n) \\ \theta_{error}(n) \\ \left(\frac{1}{2}\right)\psi_{error}(n) \end{bmatrix} \quad (18)$$

Eq. (18) applies a factor of ½ to the yaw-error term. As illustrated in FIG. 2, the yaw angle ψ in the navigation coordinate frame 130 is in a plane (here, the X-Y plane) tangent to the local surface of the earth. Using this ½ factor in the local tangent plane results in a higher priority being given to determining the other two heading angles. For a vertical launch vehicle, such as the vehicle 100, priority is given to determining the heading of the vehicle in the planes perpendicular to the surface of the earth. Other vehicles, such as horizontally launched missiles or aircraft, ships, trains or automobiles, may give higher priority to the heading in the local tangent plane.

At stage 532, the N-V transform module 415 transforms the angular rate correction vector ARCV(n) from the navigation coordinate frame 130 to the vehicle coordinate frame 140 using the current quaternion Q(n) as follows:

$$ARCV_{Veh}(n) = \begin{bmatrix} \omega_{ARCV-x}(n) \\ \omega_{ARCV-y}(n) \\ \omega_{ARCV-z}(n) \end{bmatrix} = [Q(n)]ARCV_{Nav}(n)[Q(n)]^* \quad (19)$$

Optional stages 536, 540, 544 can be utilized to manipulate the transformed ARCV vector in order to improve performance by avoiding using spurious acceleration and/or rate measurements received from the accelerometer subsystem 320 or the rate sensor subsystem 325, respectively.

At stage 536, the rates of the ARCV are low-pass filtered with the low-pass filter 412. The low pass filter 412 filters using the following formula:

$$\text{filt\_ARCV}_{Veh}(n)=(A)\text{filt\_ARCV}_{Veh}(n-1)+(B)\text{ARCV}_{Veh}(n) \quad (20)$$

In the example attitude estimation system 315, the filter coefficients are B=0.06, and A=0.94. These coefficients provide a low-pass filter 412 with a cutoff frequency of about 10 Hz. for a sampling rate of 500 Hz. Other cutoff frequencies can be used. For example, the cutoff frequency of the low-pass filter 412 can be in a range from about 5 Hz to about 50 Hz. The low-pass filtering is omitted when the attitude error vector has not converged as determined at decision block 516.

At stage 540, the rates of the ARCV vector are limited by the rate limit function 416 to the maximum value as determined by the rate limit vector L that was set at either stage 520 or stage 524, depending on the state of convergence of the angular error vector AEV(n). The rate limiting function 416 implements the following formula:

$$\begin{bmatrix} \omega_{ARCV-x}(n) \\ \omega_{ARCV-y}(n) \\ \omega_{ARCV-z}(n) \end{bmatrix} = \underset{\pm L_1}{Limit}(\text{filt\_ARCV}_{Veh}(n)) \quad (21)$$

At stage 544, the rates of the ARCV are set to zero when the acceleration indications represent a probable spurious measurement. Because the initialization process 500 is being performed during a time period when the only acceleration is due to gravity, the magnitude of the acceleration indication should be about 1G. If the acceleration indication is too high, e.g., above 1.03 G, or too low, e.g., below 0.97 G, the rates of the ARCV are set to zero so that the quaternion update algorithm is not adversely affected by the spurious acceleration indications. The acceleration magnitude is calculated using the following formula:

$$\text{AccelMagnitude}(n)=\sqrt{A_x(n)^2+A_y(n)^2+A_z(n)^2} \quad (22)$$

The following pseudo-code shows how the rates are set to zero when the AccelMagnitude(n) is more than 3% above or below 1G:

IF ( AccelMagnitude > 1.03 G OR AccelMagnitude < 0.97 G)
   ARCV$_{Veh}$(n) = 0
END At stage 548, the quaternion update subsystem 420 determines corrective vehicle rates [ω$_{Cor}$]=[ω$_{X-Cor}$, ω$_{Y-Cor}$, ω$_{Z-Cor}$] based on the received angular rate indications

[$\omega_X$, $\omega_Y$, $\omega_Z$] and the vehicle angular rate correction vector $ARCV_{Veh}(n)$. The rate indications are subtracted from the corrective vehicle rates using the adders 422, 424, 426. The corrective vehicle rates are provided to the quaternion integration subsystem 430.

At stage 552, the quaternion integration subsystem 430 determines an updated quaternion $Q(n+1)$ by integrating a rotation of the current quaternion at rates as determined by the current $ARCV_{Veh}(n)$ over a time step $\Delta t$ corresponding to the periodicity of the quaternion update algorithm. The periodicity time step $\Delta t$ can be limited by the sample rate of the sensors or a maximum duty cycle of the processor. The quaternion integration can be accomplished using a standard solution to Puasson's equation, as follows:

$$Q(n+1) = +\dot{Q}(n)\Delta t \quad (23)$$

where:

$$\dot{Q}(n) = \tfrac{1}{2}\Omega Q(n) \quad (24)$$

and $$\Omega = \begin{bmatrix} 0 & -\omega_{Cor-x} & -\omega_{Cor-y} & -\omega_{Cor-z} \\ \omega_{Cor-x} & 0 & \omega_{Cor-z} & -\omega_{Cor-y} \\ \omega_{Cor-y} & -\omega_{Cor-z} & 0 & \omega_{Cor-x} \\ \omega_{Cor-z} & \omega_{Cor-y} & -\omega_{Cor-x} & 0 \end{bmatrix} \quad (25)$$

The updated quaternion $Q(n+1)$ is provided to the V-N Transform module 405 and the N-V transform module 415 for subsequent periodic time steps.

At decision block 556, the quaternion update subsystem 420 determines if a time period for the quaternion initialization/estimation process 500 has expired. If the time period has not expired, the process 500 continues back to stage 504. If the time period has expired, the process 500 concludes. Upon conclusion of the process 500, the finalized initial quaternion $Q_{INIT}$ 435 is provided by the quaternion update subsystem 420 to the other subsystems of the INS 120 for use in the guidance, navigation and control functions.

Other embodiments are within the scope and spirit of the appended claims. For example, due to the nature of software, functions described above can be implemented using software, hardware, firmware, hardwiring, or combinations of any of these. Features implementing functions may also be physically located at various positions, including being distributed such that portions of functions are implemented at different physical locations. Attitude initialization/estimation systems in accordance with the disclosure can be used to determine an updated quaternion during any time period during which the only substantial acceleration on the vehicle is gravity. Attitude initialization/estimation systems in accordance with the disclosure can be used for vehicles including air-air missiles, air-ground missiles, horizontally launched aircraft, ships, automobiles, dirigibles, and others.

Further, more than one invention may be disclosed.

What is claimed is:

1. A method of determining a quaternion for relating a vehicle coordinate frame to an inertial coordinate frame, the method comprising:
   receiving, by a processor, periodic indications of angular rates of the vehicle from a plurality of angular rate sensors associated with the vehicle during a first time period;
   receiving, by the processor, periodic indications of acceleration that the vehicle is experiencing during the first time period when acceleration that the vehicle is subject to is due to gravity;
   receiving, by the processor, periodic indications of an inertial reference vector during the first time period, the inertial reference vector indications being in a vehicle coordinate frame;
   transforming, using the processor, the received acceleration and inertial reference vector indications from the vehicle coordinate frame to an inertial navigation coordinate frame based on a current quaternion to provide transformed acceleration indications and transformed reference vector indications;
   determining, using the processor, an angular error vector in the inertial navigation coordinate frame by comparing the transformed acceleration indications to a predefined gravity vector in the inertial navigation coordinate frame and by comparing the transformed inertial reference vector indications to a predefined reference vector in the inertial navigation coordinate frame;
   determining, using the processor, an angular rate correction vector, to counter the determined angular error vector in the inertial navigation coordinate frame, based on the determined angular error vector and a first gain factor;
   transforming, using the processor, the angular rate correction vector from the inertial navigation coordinate frame to the vehicle coordinate frame, to produce vehicle angular rate corrections, based on the current quaternion;
   determining, using the processor, corrective vehicle rates based on the received angular rate indications and the vehicle angular rate corrections; and
   determining, using the processor, an updated quaternion by integrating a rotation of the current quaternion over a second time period based on the determined corrective vehicle rates, the second time period being a portion of the first time period.

2. The method of claim 1 wherein determining the angular rate correction vector comprises:
   determining, using the processor, that at least one component of the angular error vector has converged below a threshold; and
   in response to determining that the at least one component of the angular error vector has converged below the threshold, determining, using the processor, at least one component of the angular rate correction vector based on a second gain factor that is lower than the first gain factor.

3. The method of claim 2 wherein determining that at least one component of the angular error vector has converged below the threshold comprises determining, using the processor, that a magnitude of the angular error vector has converged below the threshold.

4. The method of claim 1 wherein determining the angular error vector comprises comparing the transformed inertial reference vector indications to a local tangent reference vector that is perpendicular to the gravity vector.

5. The method of claim 1 wherein determining the angular rate corrections comprises:
   limiting at least one component of the determined angular rate correction vector to a maximum value to produce a limited angular rate correction vector; and
   determining, using the processor, the corrective vehicle rates based on the limited angular rate correction vector.

6. The method of claim 1 further comprising:
low-pass filtering the angular rate correction vector; and determining, using the processor, the corrective vehicle rates based on the filtered angular correction vector.

7. The method of claim 6 wherein the low-pass filtering comprises using a low-pass filter with a cut-off frequency of about 10 Hz.

8. The method of claim 1 further comprising:
determining, using the processor, if a magnitude of the acceleration indications is below a threshold value; and
in response to determining that the magnitude of the acceleration indications is below the threshold, setting the angular rate correction vector to zero.

9. The method of claim 1 further comprising:
determining, using the processor, if a magnitude of the acceleration indications is above a threshold value; and
in response to determining that the magnitude of the acceleration indications is above the threshold value, setting the angular rate correction vector to zero.

10. An attitude estimation system comprising:
an input interface comprising:
a first input configured to couple to angular rate sensors associated with a vehicle and receive periodic indications of angular rates of the vehicle during a first time period,
a second input configured to couple to an accelerometer subsystem and receive periodic indications of acceleration that the vehicle is experiencing during the first time period when acceleration that the vehicle is subject to is due to gravity, and
a third input configured to couple to an inertial reference subsystem and receive periodic indications of an inertial reference vector during the first time period, the inertial reference vector indications being in a vehicle coordinate frame;
a first quaternion transform subsystem coupled to the input interface and configured to transform the acceleration and inertial reference vector indications received during the first time period from the vehicle coordinate frame to an inertial navigation coordinate frame based on a current quaternion to provide transformed acceleration indications and transformed reference vector indications;
an attitude correction control subsystem coupled to the first quaternion transform subsystem and configured to:
determine an angular error vector in the inertial navigation coordinate frame by comparing the transformed acceleration indications to a predefined gravity vector in the inertial navigation coordinate frame and by comparing the transformed inertial reference vector indications to a predefined reference vector in the inertial navigation coordinate frame, and
determine an angular rate correction vector, to counter the determined angular error vector in the inertial navigation coordinate frame, based on the determined angular error vector and a first gain factor, and
a second quaternion transform subsystem coupled to the attitude correction control subsystem and configured to transform the angular rate correction vector from the inertial navigation coordinate frame to the vehicle coordinate frame, to produce vehicle angular rate corrections, based on the current quaternion;
a quaternion update subsystem coupled to the input interface, the attitude correction control subsystem and the first and second quaternion transform subsystems and configured to:
determine corrective vehicle rates based on the received angular rate indications and the vehicle angular rate corrections; and
determine an updated quaternion by integrating a rotation of the current quaternion over a second time period based on the determined corrective vehicle rates, the second time period being less than the first time period.

11. The attitude estimation system of claim 10 wherein the attitude correction subsystem is configured to:
determine that at least one component of the angular error vector has converged below a threshold, and
in response to determining that the at least one component of the angular error vector has converged below the threshold, determine at least one component of the angular rate correction vector based on a second gain factor that is lower than the first gain factor.

12. The attitude estimation system of claim 11 wherein the attitude correction control subsystem determines that at least one component of the angular error vector has converged by determining that a magnitude of the angular error vector has converged below the threshold.

13. The attitude estimation system of claim 10 wherein the attitude correction control subsystem is configured to determine the angular error vector by comparing the transformed inertial reference vector indications to a local tangent reference vector that is perpendicular to the gravity vector.

14. The attitude estimation system of claim 10 wherein the attitude correction control subsystem is configured to limit at least one component of the determined angular rate correction vector to a maximum value to produce a limited angular rate correction vector, and the quaternion update subsystem is configured to determine the corrective vehicle rates based on the limited angular rate correction vector.

15. The attitude estimation system of claim 10 further comprising:
a filter configured to low-pass filter the angular rate correction vector; and
wherein the quaternion update subsystem determines the corrective vehicle rates based on the filtered angular rate correction vector.

16. The attitude estimation system of claim 15 wherein the filter comprises a low-pass filter with a cut-off frequency of about 10 Hz.

17. The attitude estimation system of claim 10 wherein the attitude correction subsystem is further configured to:
determine if a magnitude of the acceleration indications is below a threshold value; and in response to determining that the magnitude of the acceleration indications is below the threshold, set the angular rate correction vector to zero.

18. The attitude estimation system of claim 10 wherein the attitude correction subsystem is further configured to:
determine if a magnitude of the acceleration indications is above a threshold value; and
in response to determining that the magnitude of the acceleration indications is above the threshold, set the angular rate correction vector to zero.

19. An attitude estimation system comprising:
an input interface comprising:
a first input configured to couple to angular rate sensors associated with a vehicle and receive periodic indications of angular rates of the vehicle during a first time period,
a second input configured to couple to an accelerometer subsystem and receive periodic indications of acceleration that the vehicle is experiencing during the first time period when acceleration that the vehicle is subject to is due to gravity, and a third input configured to couple to an inertial reference subsystem and receive periodic indications of an inertial reference vector during the first time period, the inertial reference vector indications being in a vehicle coordinate frame;

a first quaternion transform subsystem coupled to the input interface and configured to transform the acceleration and inertial reference vector indications received during the first time period from the vehicle coordinate frame to an inertial navigation coordinate frame based on a current quaternion to provide transformed acceleration indications and transformed reference vector indications;

an attitude correction control subsystem coupled to the first quaternion transform subsystem, the attitude correction control subsystem comprising:

means for determining an angular error vector based on the transformed acceleration indications and a predefined gravity vector in the inertial navigation coordinate frame and further based on the transformed inertial reference vector indications and a predefined reference vector in the inertial navigation coordinate frame, and means for determining an angular rate correction vector, to counter the determined angular error vector based on the determined angular error vector and a first gain factor, and a second quaternion transform subsystem coupled to the attitude correction control subsystem and configured to transform the angular rate correction vector from the inertial navigation coordinate frame to the vehicle coordinate frame, to produce vehicle angular rate corrections, based on the current quaternion;

a quaternion update subsystem coupled to the input interface, the attitude correction control subsystem and the first and second quaternion transform subsystems, the quaternion updated subsystem comprising:

means for determining corrective vehicle rates based on the received angular rate indications and the vehicle angular rate correction vector, and for determining an updated quaternion by integrating a rotation of the current quaternion over a second time period based on the determined corrective vehicle rates, the second time period being less than the first time period.

* * * * *